United States Patent [19]

Arima

[11] Patent Number: 4,849,861
[45] Date of Patent: Jul. 18, 1989

[54] VEHICLE LAMP DEVICE

[75] Inventor: Yoshiharu Arima, Shizuoka, Japan

[73] Assignee: Koito Manufacturing Co., Inc., Tokyo, Japan

[21] Appl. No.: 234,352

[22] Filed: Aug. 18, 1988

[30] Foreign Application Priority Data

Mar. 16, 1988 [JP] Japan .................... 62-60281

[51] Int. Cl.[4] .............................. B60Q 3/00
[52] U.S. Cl. .................... 362/61; 362/268; 362/80; 362/331
[58] Field of Search ............ 362/61, 80, 208, 83, 362/331, 267, 308, 309, 332, 336; 340/93

[56] References Cited

U.S. PATENT DOCUMENTS

| | | | |
|---|---|---|---|
| 4,019,045 | 4/1977 | Bassett | 362/61 |
| 4,251,103 | 2/1981 | Nakajima et al. | 362/61 |
| 4,459,644 | 7/1984 | Bailly | 362/368 |
| 4,475,148 | 10/1984 | Tomforde | 362/83 |
| 4,652,979 | 3/1987 | Arima | 362/80 |
| 4,654,761 | 3/1987 | Walsh | 362/80 |
| 4,670,823 | 6/1987 | Kochi et al. | 362/268 |
| 4,722,023 | 1/1988 | Arima et al. | 362/80 |

FOREIGN PATENT DOCUMENTS

| | | | |
|---|---|---|---|
| 569298 | 1/1959 | Canada | 362/268 |
| 0243241 | 10/1987 | European Pat. Off. | 362/80 |
| 2647090 | 4/1978 | Fed. Rep. of Germany | 362/80 |
| 2084309 | 4/1982 | United Kingdom | 362/336 |

*Primary Examiner*—Ira S. Lazarus
*Assistant Examiner*—D. M. Cox
*Attorney, Agent, or Firm*—Sughrue, Mion, Zinn, Macpeak & Seas

[57] ABSTRACT

A vehicle lamp device for use as a combination tail light or the like in which dark areas in the output light pattern are eliminated and potential bulb heat damage to interior portions is prevented. A lamp body is divided horizontally by a partition plate into upper and lower chambers. A plate-like inner lens covers front and side opening portions of the lamp body and is mounted to slant in the same direction as a covering front lens. The inner lens has integrally formed therewith a covering portion which covers the forward portion of the partition plate.

11 Claims, 4 Drawing Sheets

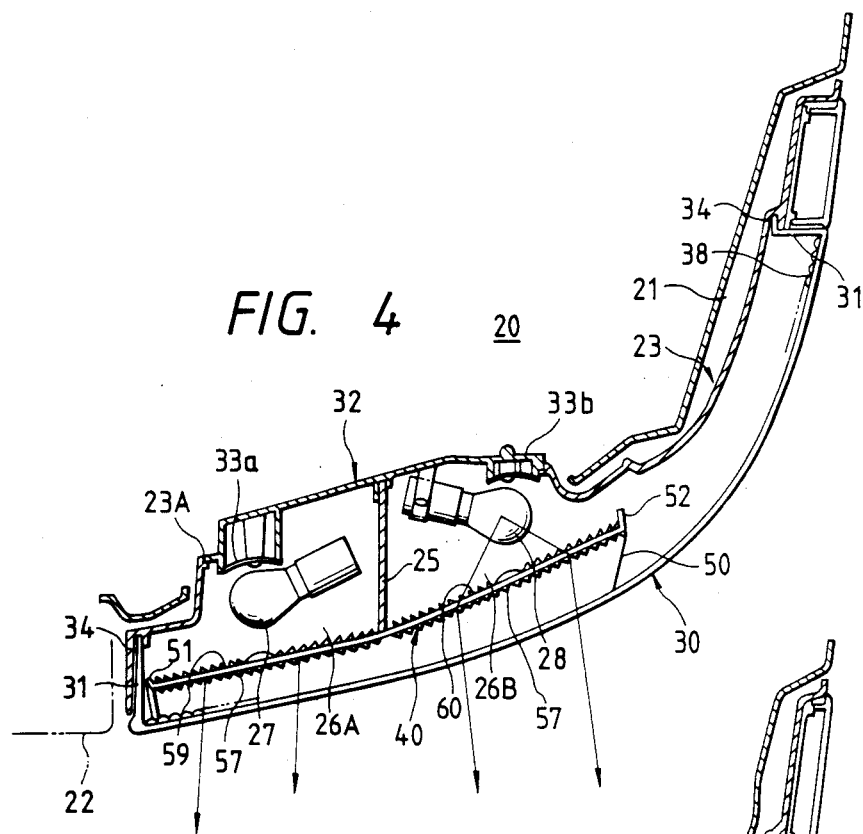
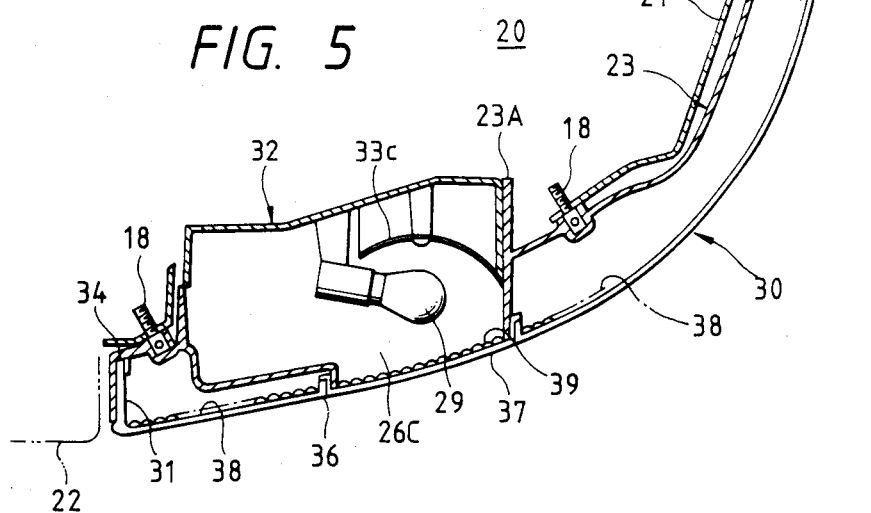

VEHICLE LAMP DEVICE

BACKGROUND OF THE INVENTION

The present invention relates to vehicle lamp device suitable for use as a tail light, tail and mark light, or the like, which may be attached to the corner portion of a vehicle body.

Conventionally, as a tail and marker lamp (hereinafter simple referred to as a "lamp") attached to a corner portion of a vehicle body, there has been known a vehicle lamp device arranged as shown in FIG. 1. Such a lamp device will be described in brief. In FIG. 1, reference numeral 1 designates a lamp body which is curved to conform to a corner portion of a vehicle body and which is opened to the front and side of the vehicle body. The inside of the lamp body 1 is partitioned by a partition plate 2 into two (upper and lower) lamp chambers 3 and 4. A tail and marker bulb 5 and an inner lens 6 are disposed within the upper chamber 3, and a back-up bulb 7 is disposed within the lower chamber 4. The front and side opening portions of the lamp body 1 are commonly covered by a front lens 8 which curves along the corner portion of the vehicle body. A rear cover 10 is fittingly fixed to a rear opening portion 9 of the body 1. The bulbs 5 and 7 and concave reflectors 11 and 12 for reflecting light emitted from the bulbs 5 and 7 in the forward direction are mounted on the surface of the cover 10. The front lens 8 is formed to curve backward at a position corresponding to the partition plate 2 so that the front lens 8 has an angular shape in longitudinal section. The inner lens 6 is disposed on the partition panel 2 substantially perpendicularly to the latter, and a Fresnel lens 13 is disposed on the rear surface of the inner lens 6 to convert light emitted by the tail and marker bulb 5 into parallel light rays extending parallel to the optical axis of the inner lens 6.

In the thus-arranged vehicle lamp device, the inner lens 6 is plate-like with a leg portion 6A bent backward by about 90 degrees, and it is integrally formed with the inner lens 6 at its lower end for purposes of better productivity, standardization of parts, lower manufacturing costs, and the like. However, because the inner lens 6 is arranged corresponding to a part of the rear surface of the front lens 8, which is curved along the vehicle body corner portion, a central portion of the inner lens 6 is separated from the rear surface of the front lens 8. As a result, a dark zone, as indicated by marks xxxxxx, tends to occur on the partition plate 2 at the portion 2a in front of the inner lens 6, thereby making the appearance of the lamp 14 poor when the lamp 14 is viewed in the direction of an arrow A. Further, there has been a problem in that the inner lens 6 is apt to be deformed by the heat of the bulb 5 because the volume of the lamp chamber 3 is made small by the inner lens 6.

SUMMARY OF THE INVENTION

It is therefore an object of the present invention to eliminate the foregoing disadvantages in the prior art lamp and to provide a vehicle lamp device with a simple arrangement in which no dark zone is produced between a lower end portion of an inner lens and a surface of a partition plate of a lamp body so that the appearance of the lamp device is improved and deformation of the inner lens by bulb heat is avoided.

In order to attain the above and other objects, according to the present invention, a vehicle lamp device is provided in which the inside of a lamp body disposed at a corner portion of a vehicle body and opened to the front and to the outer side of the vehicle body is partitioned into two lamp chambers by a partition plate, light sources are housed within the respective lamp chambers, the front and side opening portions of the lamp body are covered with a front lens, the front lens is curved along the vehicle body corner portion so as to have an angular shape in longitudinal section, an inner lens formed in a plate-like shape is disposed in the upper lamp chamber mounted so as to slant in the same direction as the front lens, and a covering portion is integrally provided on a lower end of the inner lens, the cover portion having a top and extending to an inner surface of the front surface lens so as to cover a front end portion of a surface of the partition plate.

According to the present invention, the front end portion of the front surface of the partition plate of the lamp body is covered with the covering portion of the inner lens. Hardly any dark zone is therefore generated between the leg portion of the inner lens and the front end portion of the front surface of the partition plate. Further, the slanting arrangement of the inner lens makes the volume of the lamp chamber large and allows the inner lens to be further separated from the bulbs so as to receive less heat from the bulbs.

BRIEF DESCRIPTION OF THE DRAWINGS

FIG. 4 is a sectional view taken along a line IV—IV in FIG. 6;

FIG. 5 is a sectional view taken along a line V—V in FIG. 6;

DESCRIPTION OF THE PREFERRED EMBODIMENTS

Figure 1:
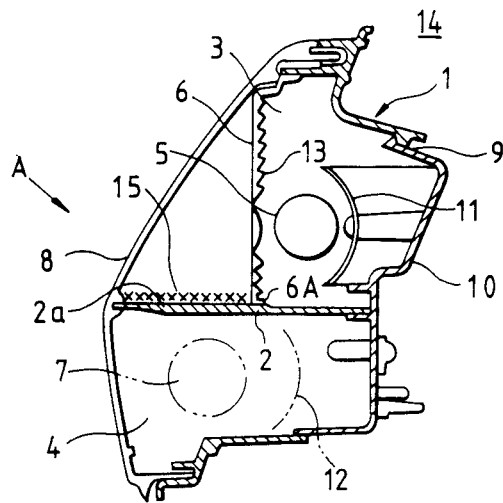
FIG. 1 is a sectional view showing an example of a conventional vehicle lamp device.

The present invention will be described in detail with reference to preferred embodiments illustrated in the accompanying drawings.

Referring to FIGS. 2 through 8 of the drawings, a lamp device generally designated by reference numeral 20 constitutes a combination lamp of the curved type adapted to be attached to a right corner portion of a front surface of a vehicle body 21 (viewed from the front side of the vehicle body 21) adjacent to an outer side surface of a front lamp 22. The lamp device 20 is provided with a lamp body 23 which is curved along the right corner portion so that the lamp body 23 is opened to the front and to the outer side of the vehicle body. The inside of the lamp body 23 is partitioned by a horizontal partition plate 24 projecting from an intermediate portion in height of a lamp body front surface and a vertical wall plate 25 (FIG. 4) extending vertically from the upper surface of the partition plate 24 at the vehicle body front side.

Thus, the lamp body 23 has three, that is, two upper and one lower, lamp chambers 26A, 26B, and 26C in which a tail bulb 27, a tail and marker bulb 28, and a back-up bulb 29 are respectively housed. An opening 23A is formed through the lamp body 23 to the lamp chambers 26A, 26B, and 26C, and a rear cover 32 holding the lamps 27, 28, and 29 and reflectors 33a, 33b, and 33c therefor is fittingly fixed to the opening 23A from the rear side. The partition wall 24 is formed on the inside end of the lamp body 23, extending from one end of the lamp body 23 at the front lamp side to an outer side end of the lamp body 23. An end surface 24a of the partition plate 24 is curved with substantially the same curvature as the corner portion of the vehicle body 21. The lamp body 23 is fixed to the vehicle body 21 by a plurality of stud bolts 18 (FIG. 5).

Figure 2:
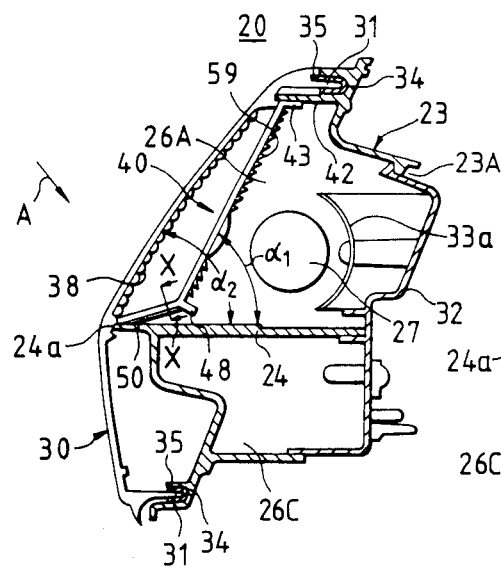
FIG. 2 is a sectional view showing a preferred embodiment of the present invention taken along a line II—II in FIG. 6.
Figure 3:
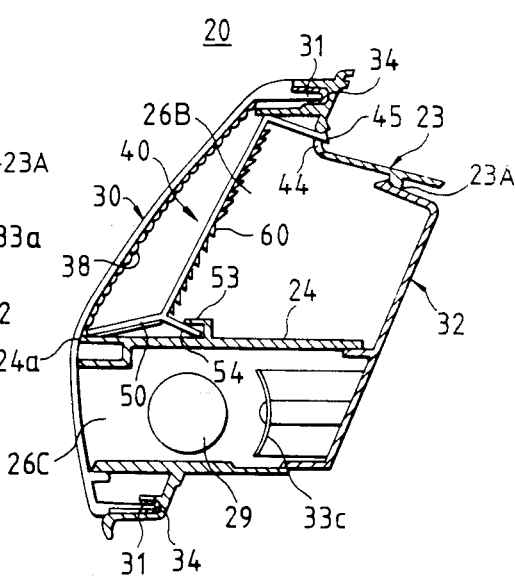
FIG. 3 is a sectional view taken along a line III—III in FIG. 6.
Figure 6:
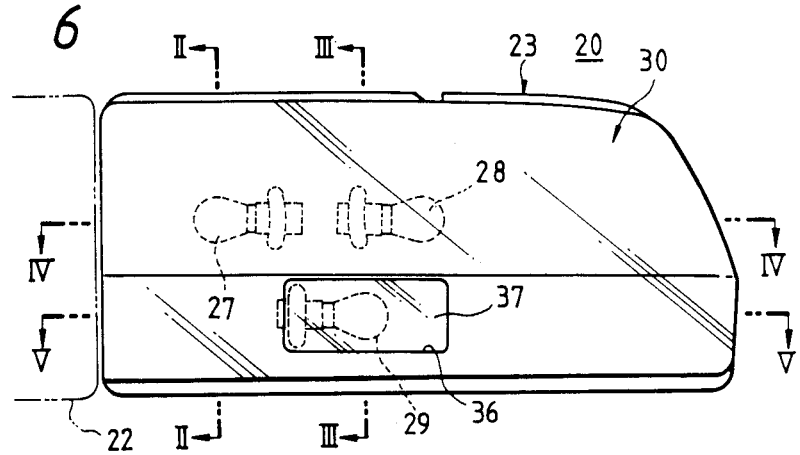
FIG. 6 is a front view of a lamp device of a preferred embodiment of the invention.
Figure 7:
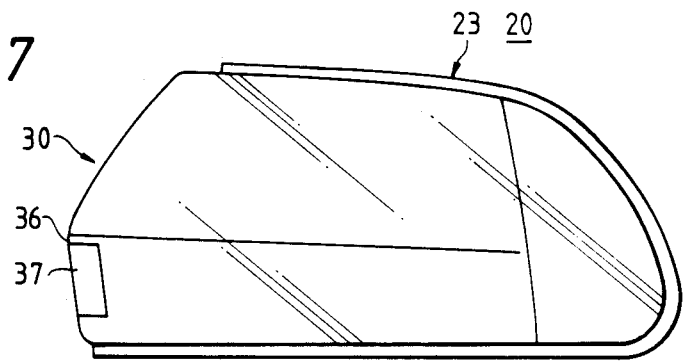
FIG. 7 is a right side view of the same.

Reference numeral 30 designates a front lens commonly covering the front and side opening portions of the lamp body 23. The front lens 30 is curved with substantially the same curvature as the corner portion of the vehicle body 21 so as to constitute a curved lens having a substantially L-shaped cross section as shown in FIGS. 4 and 5. The front lens 30 has an angular shape in longitudinal section and is bent backward at its portion abutted by the end surface 24a of the partition plate 24 so that the upper and lower portions of the front end 30 are tilted backward at different angles as shown in FIGS. 2 and 3.

A peripheral wall plate 31 is integrally and projectingly provided on a rear peripheral portion of the front lens 30 extending along the entire peripheral surface thereof. An end portion of the peripheral wall plate 31 is inserted into a circular groove 34 formed in a front surface peripheral portion of the lamp body 23 and fixed thereto by an adhesive 35 (FIG. 2).

The front lens 30 is colored red over its entire surface. An opening 36 (FIG. 5) is formed through the front lens 30 at a portion corresponding to the lower lamp chamber 26C, and the opening 36 is covered with a colorless transparent lens 37. The lens 37 is integrally formed with the front lens 30 by a dichromatic molding method. That is, after being separately formed from the front lens 30, the lens 37 may be inserted into the opening 36 and fixed thereto by ultrasonic welding or the like. Diffusion lenses 38 and 39, each composed of a large number of small convex lenses for diffusing light emitted from the bulbs 27, 28, and 29, are formed on rear surfaces of the front lens 30 and lens 37, respectively.

Figure 8:
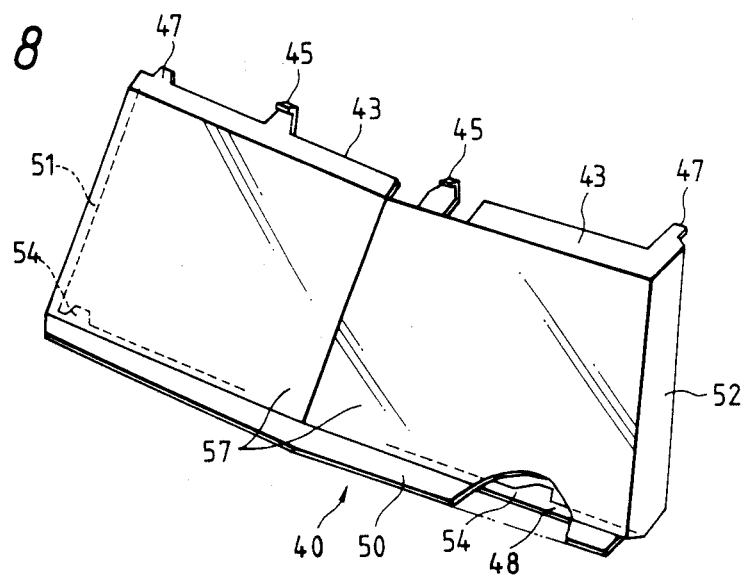
FIG. 8 is a partially broken perspective view showing an inner lens.

An inner lens 40, which is an important feature of the present invention, is disposed on the partition plate 24 within the lamp body 23 corresponding positionally to the upper lamp chambers 26A and 26B. The inner lens 40 is formed of a colorless transparent acrylic plate or the like so as to have a plate-like shape, as shown in FIG. 8, and a substantially V-shaped cross section because it is bent backward at a suitable angle at its widthwise central portion, that is, a portion thereof where the inner lens 40 is arranged so as to slant toward the rear of the vehicle body so that the inner lens 40 is substantially parallel to an upper portion internal surface of the front lens 30 as shown in FIGS. 2 and 3. The slanting angle $\alpha_1$ of the inner lens 40 is selected to be slightly larger than the slanting angle $\alpha_2$ of a portion of the front lens 30 above the partition plate 24 ($\alpha_1 > \alpha_2$).

Figure 9:
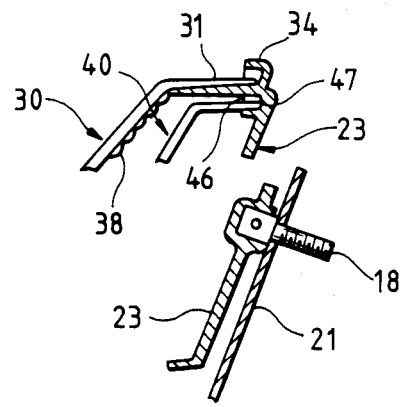
FIG. 9 is a sectional view showing a main part of the inner lens.

An abutment portion 43, a pair of right and left engagement portions 45, and a pair of right and left positioning portions 47 are integrally provided with the inner lens 40 at its upper end portion projecting backward with the abutment portion 43 abutting an inside wall 42 (FIG. 2) of the circular groove 34 of the lamp body 23. The pair of right and left engagement portions 45 are inserted into and engaged with engagement holes 44 (FIG. 3) of the lamp body 23, and the pair of right and left positioning portions 47 are inserted into blind holes 46 (FIG. 9) formed in the front surface of the lamp body 23 at a portion further inward than the circular groove 34. A leg portion 48 and a covering portion 50 are integrally and projectingly provided with the inner lens 40 at its lower end, with the leg portion 48 extending backward substantially at a right angle and the covering portion 50 extending frontward at a suitable angle. Side plate portions 51 and 52 extending backward are integrally and projectingly provided on the inner lens 40 at its left and right side ends, respectively.

A pair of right and left positioning portions 54 are integrally provided with the leg portion 48 at its opposite end portions with the positioning portions 54 being inserted into and engaged with engagement holes 53 (FIG. 3) formed in the partition plate 24. The covering portion 50 is provided on the upper side of the partition plate 24 so as to cover the portion in front of the lower end of the inner lens 40, with a top end of the covering portion 50 extending to a top end of the partition plate 24 so as to abut the rear surface of the front lens 30.

Figure 10:
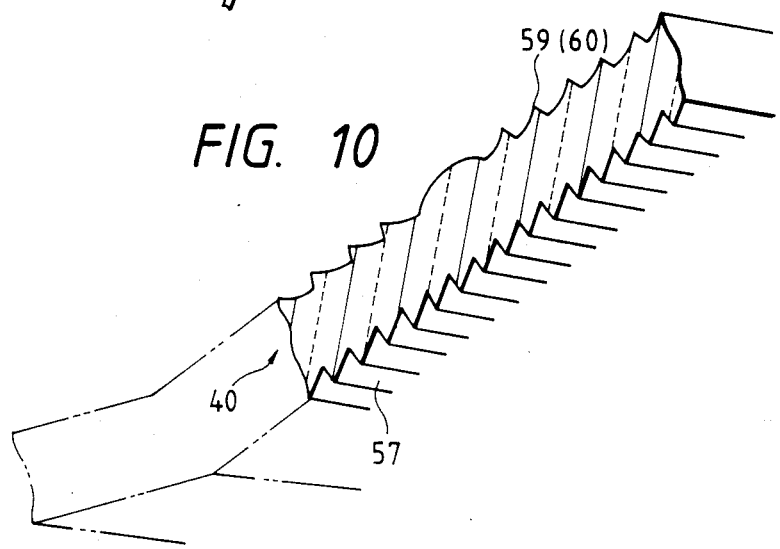
FIG. 10 is a perspective view showing the main part of the inner lens.
Figure 11:
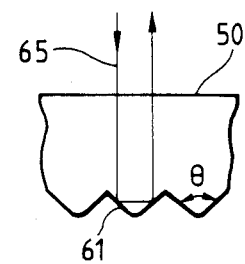
FIG. 11 is a sectional view taken along a line X—X in FIG. 2.

Refraction prisms 57 constituted by projections each having a right-angle triangular cross section as shown in FIG. 10 for refracting light emitted from the bulbs 27 and 28 downward and toward the central portion extend rightward and downward as shown in FIG. 8. Eccentic Fresnel lenses 59 and 60 for directing light emitted from the bulbs 27 and 28 forward as parallel light rays parallel with the optical axis of the inner lens 40 are formed on the rear surface of the inner lens 40 in positions corresponding to the bulbs 27 and 28. A large number of triangular cross section ($\Theta = 90°$) as shown in FIG. 11 with rounded peaks are formed side by side on the rear surface of the covering portion 50 over the entire width thereof extending longitudinally in parallel with each other.

In the thus-arranged vehicle lamp device, since the front end portion of the front surface of the partition plate 24 is covered with the covering portion 50 integrally provided with the lower end of the inner lens 40, no dark zone is observed between the leg portion 48 and the front portion of the partition plate 24 when the lamp device is viewed from the front side of the vehicle body. Thus, the appearance quality of the lamp device is significantly improved. Further, each of the triangular steps 61 provided on the rear surface of the covering portion 50 is arranged to reflect external light 65 (FIG. 11) slantingly downwardly incident in the direction of an arrow A in FIG. 2 in the same direction as the incident direction by the two slanting surfaces of the triangular steps 61. Thus, the triangular steps 61 function as a reflector. Thus, it appears as if a mirror were present inside the front lens 30, so that there is a possibility that the partition plate 24 is actually viewed through the front lens 30 and the covering portion 50.

It is unnecessary to provide the covering portion 50 if the entire inner lens 40 is curved in the same manner as the front lens 30. In this case, however, the cost for producing a metal mold for the inner lens 40 is quite high, similar to the front lens 30, and further the formation of the Fresnel lenses 59 and 60 is difficult if the inner lens 40 has a curved surface, boosting the cost of the metal mold still further. It is uneconomical to have a high production cost for parts of this kind which are not viewed from the outside. However, according to the present invention, the inner lens 40 is formed so as to be plate-like and the covering portion 50 is integrally formed with the lower end of the inner lens 40 so that the lens 40 and the Fresnel lenses 59 and 60 can be easily produced at a low cost.

Further, according to the present invention, the inner lens 40 is slantingly disposed substantially parallel to the rear surface of the front lens 30, whereby the intervals between the inner lens 40 and the bulbs 27 and 28 can be made large to thereby make it possible to prevent deformation of the inner lens 40 by heat from the bulbs.

Further, although a description has been provided concerning a device in which three lamps, that is, a tail lamp, tail and mark lamp, and back-up lamp are incorporated in a single body, the present invention is not limited to this arrangement and is applicable to the case where the lamp body is partitioned by the partition plate 24 into two (upper and lower) lamp chambers and light sources are housed in the respective chambers so as to provide two different displays.

As described above, the vehicle lamp device according to the present invention is arranged such that the inside of the lamp body attached to the corner portion of the vehicle body is partitioned by the partition plate into upper and lower lamp chambers, the front and side opening portions of the lamp body are covered with a front lens of the curved type having an angular shape in cross section, the plate-like inner lens formed on the partition plate is slantingly disposed in the same direction as the front lens, and the covering portion extending forward to abut the internal surface of the front lens is integrally provided with the lower end of the inner lens so as to cover the front end portion of the front surface of the partition plate. Accordingly, formation of a dark portion on the front end portion of the front surface of the partition plate is prevented, thereby improving the appearance quality of the lamp body. Further, not only can the inner lens be easily produced at a low cost because it is formed in the form of a plate, but, because the inner lens is slantingly disposed so that the respective intervals between the inner lens and the bulbs can be made large, thermal deformation of the inner lens is prevented.

What is claimed is:

1. A vehicle lamp device comprising a lamp body disposed at a corner portion of a vehicle body and opened to the front and to the outer side of said vehicle body; a partition plate for partitioning said large body into upper and lower lamp chambers; respective light sources housed within said lamp chambers; a front lens covering front and side opening portions of said lamp body, said front lens being curved along said vehicle body corner portion so as to have an angular shape in longitudinal section; an inner lens formed in a plate-like shape disposed in said upper lamp chamber and slanting in the same direction as said front lens; and a covering portion integrally provided on a lower end of said inner lens, said cover portion having an end extending to an inner surface of said front surface lens so as to cover a front end portion of a surface of said partition plate.

2. The vehicle lamp device of claim 1, wherein a slanting angle $\alpha_1$ of said inner lens is slightly larger than a slanting angle $\alpha_2$ of a portion of said front lens above said partition plate.

3. The vehicle lamp device of claim 1, wherein said cover portion has formed therein a large number of projections having a triangular cross section.

4. The vehicle lamp device of claim 3, wherein said projections are arranged extending longitudinally parallel with one another.

5. The vehicle lamp device of claim 1, wherein said inner lens has formed in a rear surface thereof a plurality of eccentric Fresnel lenses for directing light forward as parallel light rays parallel with an optical axis of said inner lens.

6. The vehicle lamp device of claim 1, further comprising a leg portion extending rearward from said lower end of said inner lens.

7. The vehicle lamp device of claim 6, further comprising at least one positioning portion integrally provided with said leg portion, said at least one positioning portion being inserted into an engagement hole formed in said partition plate.

8. The vehicle lamp device of claim 1, further comprising an abutment portion, a pair of right and left engagement portions, and a pair of right and left positioning portions integrally provided with said inner lens at an upper end portion thereof and projecting rearward therefrom, said abutment portion abutting an inside wall of a circular groove in said lamp body, said right and left engagement portions being inserted into and engaged with engagement holes in said lamp body, and said pair of right and left positioning portions being inserted into blind holes formed in a front surface of said lamp body at a portion thereof further inward than said circular groove.

9. The vehicle lamp device of claim 1, wherein said inner lens comprises a plurality of eccentric Fresnel lenses formed therein.

10. The vehicle lamp device of claim 1, further comprising a vertical wall plate extending upward from said partition plate for partitioning said upper chamber into two chambers, and respective light sources disposed in said two chambers.

11. The vehicle lamp device of claim 1, wherein at least a portion of said front lens covering said lower chamber is clear.

* * * * *